United States Patent [19]

Tachikawa et al.

[11] Patent Number: 4,775,651

[45] Date of Patent: Oct. 4, 1988

[54] PROCESS FOR THE PRODUCTION OF SILANES

[75] Inventors: Mamoru Tachikawa, Kamifukuoka; Kazutoshi Takatsuna, Saitama; Kouji Shiozawa, Saitama; Yoshiharu Okumura, Tokyo; Takeo Koyama, Chigasaki, all of Japan

[73] Assignee: Toa Nenryo Kogyo Kabushiki Kaisha, Tokyo, Japan

[21] Appl. No.: 122,237

[22] Filed: Nov. 17, 1987

Related U.S. Application Data

[62] Division of Ser. No. 909,193, Sep. 19, 1986, Pat. No. 4,725,420.

[30] Foreign Application Priority Data

Sep. 25, 1985 [JP] Japan .................................. 60-210325
Jul. 28, 1986 [JP] Japan .................................. 61-175530

[51] Int. Cl.$^4$ ............................................. B01J 31/08
[52] U.S. Cl. .................................. 502/159; 502/164; 521/31
[58] Field of Search .................... 502/159, 164; 521/31

[56] References Cited

U.S. PATENT DOCUMENTS 3,708,462  1/1973  McKinley et al. ............. 502/159 X
4,157,312  6/1979  Frame ................................. 502/164
4,548,917  10/1985 Lepage et al. ..................... 423/347
4,605,543  12/1986 Lepage et al. ..................... 423/347

Primary Examiner—Patrick P. Garvin
Attorney, Agent, or Firm—Wenderoth, Lind & Ponack

[57] ABSTRACT

Silanes are produced by the disproportionation and/or redistribution reaction of chlorosilanes using a novel catalyst having a longer life and consisting of a quaternary phosphonium salt bonded to an organic macromolecule or polymer, represented by the following general formula:

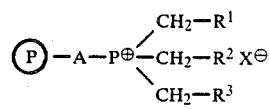

wherein (P) is an organic macromolecule or polymer, A is a bridging group between phosphorus and the organic macromolecule or polymer, $R^1$, $R^2$ and $R^3$ are selected from the group consisting of hydrogen, $C_1$–$C_{20}$ alkyl groups and aralkyl groups such as benzyl and phenethyl groups, which can contain oxygen or halogen atoms, and X is a halogen atom.

9 Claims, No Drawings

PROCESS FOR THE PRODUCTION OF SILANES

This application is a division of Ser. No. 909,193 filed Sept. 19, 1986 and now U.S. Pat. No. 4,725,420.

BACKGROUND OF THE INVENTION

1. Field of the Invention

This invention relates to a process for the production of silanes and more particularly, it is concerned with a process for the production of silanes, in particular, monosilane and/or chlorosilanes by disproportionation and/or redistribution reaction.

2. Description of the Prior Art

Silanes, in particular, monosilane is a raw material useful for the production of semiconductors, amorphous solar cells, IC devices and photosensitive materials. It is known that chlorosilanes or monosilane is obtained by the disproportionation or redistribution reaction of chlorosilanes as a raw material, as shown by the following formulas:

Thus, development or study of catalysts useful for these reactions has hitherto been carried out. These catalysts are insoluble solid anion exchange resins containing amino groups, etc. (Japanese patent application OPI (Kokai) No. 119798/1975), trimethylamine or dimethylethylamine (Japanese patent application OPI (Kokai) No. 121110/1984), palladium (Japanese patent application OPI (Kokai) No. 59230/1979), inorganic solid bases (Japanese patent application (Kokai) No. 174515/1984), compounds containing α-oxoamine groups (Japanese patent application OPI (Kokai) No. 54617/1984, tetraalkylurea (Japanese patent publication No. 14046/1980), α-pyrrolidones N-substituted by hydrocarbon groups (Japanese patent publication No. 14045/1980), cation exchange materials containing sulfonic acid groups (Japanese patent application OPI (Kokai) No. 164614/1984) and reaction products of amino alcohols and silica (Japanese patent application OPI (Kokai) No. 156907/1984). Furthermore, it is known that organo phosphorus compounds are useful for the disproportionation reaction of chlorosilanes. For example, quaternary phosphonium salts are described in Japanese patent publication No. 15529/1967, tri(-monovalent hydrocarbon groups)phosphines are described in Japanese patent publication No. 18089/1965 and of late, similar proposals have been made in Japanese patent application OPI (Kokai) No. 60915/1985 by Tokuyama Soda Co., Ltd.

That is, the above described Japanese patent application OPI (Kokai) No. 60915/1985 proposes the use of an anion exchange resin consisting of a styrene-divinylbenzene type polymer combined with a tertiary phosphine as a catalyst. However, this catalyst has technical problems with respect to water resistance, chemical resistance, heat resistance and life at high temperatures and because of the short life at high temperatures, in particular, it is not favourably useful on a commercial scale.

As described above, the catalysts consisting of organic macromolecules combined with phosphino or phosphonium groups have already been proposed, but their activity tends to deteriorate readily under reaction conditions.

SUMMARY OF THE INVENTION

It is an object of the present invention to provide a process for the production of silanes by the disproportionation and/or redistribution reaction of chlorosilanes.

It is another object of the present invention to provide a novel catalyst consisting of an organic macromolecule combined with a quaternary phosphonium salt.

These objects can be attained by a process for the production of silanes comprising subjecting a chlorosilane represented by the general formula $SiH_nCl_{4-n}$ wherein $1 \leq n \leq 3$ to disproportionation and/or redistribution in the presence of a quaternary phosphonium salt bonded to an organic macromolecule, represented by the following general formula:

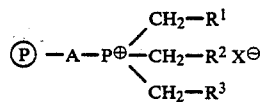

wherein Ⓟ is an organic macromolecule or polymer, A is a bridging group between phosphorus and the organic macromolecule or polymer, $R^1$, $R^2$ and $R^3$ are respectively selected from the group consisting of hydrogen, alkyl groups of $C_1$-$C_{20}$ and aralkyl groups such as benzyl and phenethyl groups, which can contain oxygen or halogen atoms, and X is a halogen atom.

DETAILED DESCRIPTION OF THE INVENTION

The inventors have made various studies on a catalyst system in which a phosphorus-carbon bond is not easily cleaved considering that the deterioration of activity is probably due to the tendency of cleavage of the phosphorus-carbon bond in an organic macromolecule in which phosphorus atom is directly bonded with an aromatic nucleus to form phosphino or phosphonium group. Consequently, the inventors have found that the activity durability is superior in a case where the bonding state of an organic macromolecule and phosphorus atom is such that the phenyl carbon in the organic macromolecule is not directly bonded to the phosphorus atom, but is bonded through at least one methylene carbon or its derivative, and the residual bonding groups to the phosphorus atom, which are not related with bonding to the organic macromolecule, contain primary carbon such as of methyl, ethyl, n-propyl, n-butyl or n-octyl, and the activity durability is very poor in another case where the residual bonding groups to the phosphorus atom contain secondary or tertiary carbon such as of cyclohexyl, t-butyl or aryl groups and even primary carbon bonded directly with an aromatic nucleus carbon such as of benzyl or tolylmethyl group. The present invention is based on this finding.

Accordingly, the present invention provides a process for the production of silanes, which comprises subjecting chlorosilanes represented by the general formula $SiH_nCl_{4-n}$ wherein $1 \leq n \leq 3$ to disproportionation and/or redistribution in the presence of a quaternary phosphonium salt bonded to an organic high molecular weight compound, represented by the following general formula,

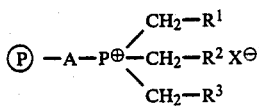

In the above described formula, Ⓟ represents an organic macromolecule and A represents a bridging group between phosphorus and the organic macromolecule, in particular, a divalent hydrocarbon radical of $C_1$ to $C_{20}$ which is not always required to be of a straight chain if bonding with phosphorus is effected through primary carbon, but can contain a side chain or cyclic structure or can be saturated. On the other hand, the bonding end of this divalent radical with the organic macromolecule can be any carbon atom of secondary to quaternary, as shown by the following general formulas:

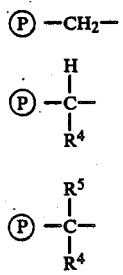

wherein $R^4$ and $R^5$ are alkyl groups.

$R^1$, $R^2$ and $R^3$ are respectively selected from the group consisting of hydrogen, $C_1$-$C_{20}$ alkyl groups and aralkyl groups such as benzyl and phenethyl groups, which can contain oxygen or halogen atoms. X represents an halogen atom.

The organic macromolecule used in the present invention is preferably one having a surface area of 2 to 1000 $m^2/g$ and a polystyrene structure or styrene-divinylbenzene copolymer structure. An organic macromolecule having a polyethylene or polyfluoroethylene structure can also be used.

Preparation of a catalyst using polystyrene or styrene-divinylbenzene copolymer (which will hereinafter be referred to as PSt-DVB) is for example carried out as follows:

(1) Polystyrene or PSt-DVB is reacted with an α, ω-dihaloalkane using a catalyst of $AlCl_3$ to introduce the ω-haloalkyl group into the aromatic nucleus of the polymer and then reacted with $PR_3$ wherein R is a primary alkyl group or phenethyl group to obtain an object compound. In this case, when the ω-haloalkyl group is introduced into the aromatic nucleus, isomerization sometimes takes place to form a haloalkyl group in which the halogen originally at the ω-position is bonded to a secondary or tertiary carbon atom and accordingly, it is preferable to effect ω-haloalkylation under moderate reaction conditions or to use a dihaloalkane having different halogen atoms such as α, ω-fluorobromoalkane or α, ω-chlorobromoalkane.

(2) An object compound is prepared by the Friedel-Craft alkylation reaction of polystyrene or PSt-DVB and a trialkyl-ω-haloalkylphosphonium halide $R_3P$-$R'$—$X^{\oplus}X'^{\ominus}$ wherein R is a primary alkyl or phenethyl group, $R'$—X is a primary ω-haloalkyl group such as 4-bromobutyl or 10-bromodecyl group and X and X' are halogen atoms, using a catalyst of $AlCl_3$.

(3) An object compound is prepared by reacting a halomethylated sytrene-divinylbenzene copolymer with $PR_3$ wherein R is a primary alkyl group or phenethyl group, the halomethylated styrene-divinylbenzene copolymer being obtained by the halomethylation reaction of the aromatic ring of PSt-DVB or by the copolymerization of a styrene-halomethylstyrene divinylbenzene.

(4) An object compound is prepared by lithiating the m- or p-position of the aromatic ring of PSt-DVB by an alkyllithium and N,N,N',N'-tetramethylethylenediamine, then introducing an ω-haloalkyl group into the aromatic nucleus by an α, ω-dihaloalkane and replacing the ω-halogen by a trialkylphosphine.

(5) An object compound is prepared by reacting p-brominated PSt-DVB and an alkyllithium to substitute Br with Li, reacting this with an α, ω-dihaloalkane to introduce the ω-haloalkyl group into the p-position and further reacting with a trialkylphosphine.

The above described reactions are known, for example, as disclosed in "Synthesis" (1978) page 315-316 and "Journal of Organic Chemistry" Vol. 41 (1976), No. 24, page 3877-3882.

In these methods, however, organolithium reagents are used which are expensive and cannot be handled without danger. Thus, it is considered that metallic lithium which can be handled with ease and safety is used instead of the dangerous and expensive organolithium reagents. That is, this alternative method comprises (a) a step of contacting an organic high molecular weight compound in which a halogen atom is directly bonded to the aromatic nucleus with metallic lithium and an α, ω-dihaloalkane represented by the general formula X (—$CH_2$)$_n$—X' wherein X and X' represent the same or different halogen atoms and n represents an integer of from 2 to 10 in a solvent and thereby obtaining an organic high molecular weight compound whose aromatic nucleus is ω-haloalkylated, (b) a step of bringing the ω-haloalkylated organic high molecular weight compound obtained in step (a) into reaction with a trialkylphosphine, and thereby forming a catalyst for the disproportionation reaction of chlorosilanes, in which the tetraalkylphosphonium salt is bonded to the organo macromolecule through the methylene group of (—$CH_2$—)$_n$ where n=2-10 as a bridging group.

In this method, the dihaloalkane is reacted with metallic lithium to form an organolithium reagent which undergoes lithium-halogen exchange with, for example, a brominated polystyrene while the organolithium reagent itself returns to the α, ω-dihaloalkane and is then reacted again with metallic lithium to form the organolithium reagent. This process is repeated until the metallic lithium is used up. Thereafter, the lithiated aromatic nucleus and regenerated dihaloalkane are reacted to cause ω-haloalkylation and on the other hand, form a lithium halide. This method of preparing the catalyst is more economical, since the process is simplified and an organolithium reagent is not used, thus avoiding danger of handling it.

The solvent used in the above described step (a) is preferably an ether type solvent, more preferably diethyl ether. The reaction temperature is preferably 0° to 40° C. As the α, ω-dihaloalkane represented by the above described general formula, there can be used 1,2-dibromoethane, 1,3-dibromopropane, 1,4-dibromobutane, 1,5-dibromopentane, 1,6-dibromohexane, 1,7-dibromoheptane, 1,8-dibromooctane, 1,10- dibromodecane, 1,3-bromochloropropane, 1,4-dichlorobutane and 1,6-dichlorohexane.

For the organic high molecular weight compound in which a halogen atom is directly bonded to the aromatic nucleus, there are ordinarily used polymers such as polystyrene and styrene-divinylbenzene copolymers and in particular, brominated polystyrenes are preferably used.

In the step (a), the metallic lithium and $\alpha, \omega$-dihaloalkane are preferably used in a proportion of 0.1 to 2 gram atom and 0.1 to 1 mol respectively to 1 mol of the organic high molecular weight compound.

The trialkylphosphine used in the above described step (b) is represented by the general formula $PR^1R^2R^3$ wherein $R^1$, $R^2$ and $R^3$ are selected from the group consisting of $C_1$–$C_8$ n-alkyl groups such as methyl, ethyl, n-propyl, n-butyl and n-octyl, and $C_4$–$C_8$ alkyl groups such as isobutyl, isopentyl and neopentyl groups in which the carbon atom bonded to the phosphorus atom is bonded to only one carbon atom. For example, the trialkylphosphines are trimethylphosphine, triethylphosphine, tri-n-propylphosphine, tri-n-butylphosphine, tri-n-hexylphosphine, tri-n-octylphosphine, dipropylbutylphosphine, triisobutylphosphine, triisopentylphosphine, triisohexylphosphine, triisooctylphosphine and trineopentylphosphine.

In the step (b), the reaction is carried out ordinarily at 50° to 180° C., preferably 100° to 150° C., optionally in the presence of a solvent such as N,N-dimethylformamide, N-methylpyrrolidone, chlorobenzene, toluene, benzene and the like. When the phosphine used has a sufficiently high boiling point, the reaction can be carried out by heating for several ten minutes to several hours using the phosphine itself as the solvent. The thus resulting polymer beads are washed with methanol or the like and dried to obtain a catalyst.

Using such a catalyst, the disproportionation and/or redistribution reaction of chlorosilanes is carried out in liquid or gaseous phase in batchwise or continuous manner. Preferably, the reaction is carried out in gaseous phase and in continuous manner, i.e. by a flowing system, because the pressure is lower and separation of the catalyst and product is easy. Other conditions are generally: a reaction temperature of 0° to 300° C., preferably 20° to 200° C., a pressure of normal pressure to 50 kg/cm² gauge and a contact time of 0.01 to 20 seconds in the gaseous phase and flowing system and 1 second to 20 minutes in the liquid phase.

The chlorosilanes used as a raw material are chlorohydrosilanes represented by $SiH_nCl_{4-n}$ wherein $1 \leq n \leq 3$. That is, at least one member selected from the group consisting of monochlorosilane, dichlorosilane and trichlorosilane and mixtures thereof can be used and the chlorosilane can be diluted with an inert gas such as nitrogen gas.

The catalyst according to the present invention is most excellent in the capacity of holding the activity of the catalysts in which phosphonium groups are bonded to organic macromolecules, and is suitable for commercial use.

The following examples are given in order to illustrate the present invention in greater detail. In these examples, the capacity of holding the catalytic activity is measured by the half-life method. That is, the half-life of the catalytic activity at a reaction temperature is determined by tracing a change of the rate constant K with the passage of time, K being represented by:

$$K = \ln \frac{Ceq}{Ceq - C} \cdot SV$$

ln: natural logarithm
Ceq: equilibrium conversion of trichlorosilane at reaction temperature
C: conversion of trichlorosilane
SV: space velocity (min$^{-1}$)

EXAMPLE 1

(1) Preparation of beads of a styrene-divinylbenzene copolymer whose aromatic nucleus is $\omega$-bromo-n-hexylated 10.7 g of porous styrene-divinylbenzene copolymer beads having bromine atom on the aromatic nucleus, prepared by a known method, for example, described in Japanese patent application OPI (Kokai) No. 80307/1983, 0.42 g of plate-shaped metallic lithium and 36 ml of ethyl ether were charged in a 4-necked flask of 250 ml purged adequately with nitrogen and gradually stirred in nitrogen atmosphere, to which a mixture of 4.12 ml of 1,6-dibromohexane in 14 ml of ether was dropwise added in 20 minutes. During the same time, the temperature of the flask was kept at 0° C. by ice water and after the dropwise addition, this temperature was kept for 4 hours, followed by gradually raising the temperature of the mixture in the flask to room temperature for 4 hours, the mixture being stirred at room temperature for 4 hours. While gradually stirring, 10 ml of methanol was added to the flask to quench the reaction, and the resulting beads were taken out by filtration, washed with methanol three times, dried in the atmosphere and then dried in the air at 100° C., thus obtaining styrene-divinylbenzene copolymer beads in which $\omega$-bromo-n-hexyl group is bonded to the aromatic nucleus.

(2) Phosphonium salt formation reaction 7.2 g of the beads obtained by the above described procedure (1) were heated with 1.0 ml of tri-n-butylphosphine and 30 ml of N,N-dimethylformamide at 135° C. in nitrogen for 3 hours. The beads were filtered, washed with methanol three times, air-dried and then vacuum-dried at room temperature for 1 hour, thus obtaining styrene-divinylbenzene copolymer beads in which tri-n-butylphosphine is bonded to the aromatic nucleus through a hexamethylene group,

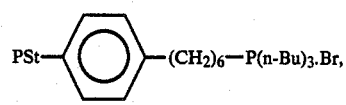

having a P content of 0.90% by weight.

(3) Disproportionation reaction of trichlorosilane 10.5 mg of the polymer-bonded phosphonium salt beads obtained in the above described (2) were charged in a glass reactor (inner diameter: 5 mm) of normal pressure flowing type, heated at 120° C. in a nitrogen stream for 1 hour and then a mixed gas of SiHCl₃/N₂ (molar ratio: 3/7) was fed thereto while holding the reaction bed at a predetermined temperature, thereby effecting a disproportionation reaction of SiHCl₃. A product obtained at 5 hours after the reaction conditions had been settled was subjected to analysis by gas chromatography using helium as a carrier gas to obtain results as shown in Table 1.

The activity of a catalyst is determined per catalytically active site (Kc) and per volume (Kv) using the following formulas:

$$Kc = \ln \frac{Ceq}{Ceq - C} \cdot \frac{SV}{N}$$

$$Kv = \ln \frac{Ceq}{Ceq - C} \cdot SV$$

Ceq: equilibrium conversion of trichlorosilane
C: real conversion of trichlorosilane
SV: space velocity
N: phosphorus concentration in catalyst (meq/ml)

EXAMPLE 2

(1) Preparation of beads of a styrene-divinylbenzene copolymer whose aromatic nucleus is ω-bromo-n-butylated 49 g of the brominated polystyrene used in Example 1—(1), 1.01 g of plate-shaped metallic lithium and 200 ml of ethyl ether were charged in a 4-necked flask of 1000 ml rinsed with nitrogen and cooled to 0° C. by ice water. While gradually stirring the suspension of the brominated polystyrene beads, a mixture of 11.0 ml of 1,4-dibromobutane and 20 ml of ethyl ether was dropwise added to the flask slowly for 30 minutes. While cooling the flask at 0° C., the mixture was stirred for one night and heated and refluxed for 3 hours after confirming that no lithium metal remained. Then, 80 ml of methanol was dropwise added thereto to quench the reaction, and the beads were filtered, washed with methanol three times, air-dried and then dried in the air at 100° C.

(2) Phosphonium salt formation reaction 10 g of the beads obtained by the above described procedure (1) were heated at 135° C. for 3 hours in nitrogen with 1.0 ml of tri-n-butylphosphine and 30 ml of N,N-dimethylformamide. The subsequent treatment was similar to that of Example 1—(2). Elemental analysis of the product showed a phosphorus content of 0.75% by weight.

(3) Disproportionation reaction of trichlorosilane

Using the phosphonium salt-bonded beads obtained in the above described procedure (2) as a catalyst, disproportionation reaction of trichlorosilane was carried out in an analogous manner to Example 1—(3). The results are shown in Table 1.

EXAMPLE 3

Synthesis method by the use of an organolithium reagent and amine compound

(1) Preparation of beads of a styrene-divinylbenzene copolymer whose aromatic nucleus is ω-bromohexylated A mixture of 3.0 g of styrene-divinylbenzene copolymer beads (29 meq), 29 mmol of n-butyllithium (petroleum ether solution), 3.35 g (29 mmol) of tetramethylethylenediamine and 20 ml of cyclohexane was heated at 65° C. and reacted for 20 hours. The resulting reaction mixture, from which a solution portion had been removed by a syringe, was washed with 10 ml of dry cyclohexane two times and the thus obtained brown beads were mixed with 50 ml of a solution of 15.0 g of 1,6-dibromohexane (61 mmol) in benzene, followed by stirring at room temperature for 10 hours. The beads were separated by filtration, washed with methanol two times and with chloroform one time, and then dried to obtain ω-bromohexylated polystyrene beads.

(2) Phosphonium salt formation reaction

A mixture of 1.0 g of ω-bromohexylated polystyrene, 0.4 ml of tri-n-butylphosphine and 5 ml of N,N-dimethylformamide was heated at 140° C. for 24 hours and subjected to phosphonium salt formation, followed by washing with methanol and chloroform, thus obtaining phosphonium-bonded polystyrene beads. Elemental analysis of the product showed a phosphorus content of 0.42% by weight (bonded to 1.5% of phenyl ring).

(3) Disproportionation reaction of trichlorosilane

Using the phosphonium salt-bonded beads obtained in the above described procedure (2) as a catalyst, disproportionation reaction of trichlorosilane was carried out in an analogous manner to Example 1—(3). The results are shown in Table 1.

EXAMPLE 4

Synthesis method by the use of an organolithium reagent and brominated polystyrene

(1) Preparation of beads of a styrene-divinylbenzene copolymer whose aromatic nucleus is ω-bromohexylated 5.0 g (25 meq) of brominated styrene-divinylbenzene copolymer beads, 25 mmol of n-butyllithium (hexane solution) and 20 ml of ether were charged in a reaction flask and stirred at room temperature for 30 minutes. The reaction mixture, from which a solution portion had been separated by a syringe, was washed with ether. The thus obtained beads were then mixed with 5.7 ml of 1,6-dibromohexane, stirred at room temperature for 20 hours, separated by filtration, washed with methanol and with chloroform and dried.

(2) Phosphonium salt formation reaction

The ω-bromohexylated polystyrene obtained by the above described procedure (1) and tri-n-butylphosphine were reacted in N,N-dimethylformamide to obtain phosphonium-bonded polystyrene beads. Elemental analysis of the product showed a phosphorus content of 0.84% by weight.

(3) Disproportionation reaction of trichlorosilane

Using the phosphonium salt-bonded beads obtained by the above described procedure (2) as a catalyst, disproportionation reaction of trichlorosilane was carried out in an analogous manner to Example 1—(3). The results are shown in Table 1.

TABLE 1

| Catalyst | Reaction Temperature (°C.) | SV (mm$^{-1}$) | Catalytic Activity | |
|---|---|---|---|---|
| | | | Kc | Kv |
| Example 1 | 120 | 350 | 6740 | 780 |
| Example 2 | 120 | 288 | 6225 | 600 |
| Example 3 | 120 | 205 | 2660 | 143 |
| Example 4 | 120 | 300 | 6385 | 688 |

EXAMPLE 5

(1) Chloromethylation of a styrene-divinylbenzene copolymer 10.4 g of styrene-divinylbenzene copolymer beads (Diaion HP-20-commercial name-manufactured by Nippon Rensui KK), 40 ml of carbon tetrachloride and 2.0 ml of chloromethyl ethyl ether were charged in a 4-necked flask of 300 ml equipped with a stirrer and cooled at 0° C. by ice water. While stirring the mixture, 0.5 ml of stannic chloride and 1.5 ml of chloromethyl ethyl ether dissolved in 10 ml of carbon tetrachloride were dropwise added thereto for 30 minutes by a dropping funnel. The reaction mixture was warmed to room temperature and stirred as it was for 24 hours. The copolymer beads were taken by filtration, washed with, in order, water-dioxane (volume ratio: 1/1), water-dioxane-hydrochloric acid (volume ratio: 5/5/1), water, dioxane and tetrahydrofuran and then subjected to Soxhlet extraction using tetrahydrofuran for 5 hours. The thus resulting beads were dried at room temperature in a nitrogen stream, thus obtaining a styrene-divinylbenzene copolymer in which the phenyl ring was partially chloromethylated in a proportion of about 6% based on all the aromatic nuclei.

(2) Reaction of the chloromethylated styrene-divinylbenzene copolymer beads and tri-n-butylphosphine 2.59 g of the chloromethylated styrene-divinylbenzene copolymer beads (hereinafter referred to as "chloromethylated PSt-DVB") obtained by the above described procedure (1), 1.0 ml of tri-n-butylphosphine and 10 ml of N,N-dimethylformamide (hereinafter referred to as DMF) were charged in a flask of 50 ml equipped with a condenser and heated at 155° C. for 20 hours in a nitrogen atmosphere. After cooling, the copolymer beads were adequately washed with methanol and chloroform, air-dried and dried at 100° C. in the air for 10 hours, thus obtaining 2.79 g of a phosphonium chloride-modified resin (Sample No. 5).

(3) Disproportionation reaction of trichlorosilane

The phosphonium chloride group-bonded beads (Sample No. 5) prepared by the above described procedure (2) were charged in a glass reactor of gaseous, normal pressure flowing type (inner diameter: 5 mm) to form a reaction bed and heated at 120° C. in a nitrogen stream for 1 hour. While keeping the reaction bed at a predetermined temperature, a mixed gas of $SiHCl_3/N_2$ (volume ratio: 3/7) under a pressure of 1 atm was fed thereto to effect the disproportionation reaction. The disproportionation was traced for several hours to one hundred and several tens hours to measure a reduction of the catalytic activity and to determine a half life of the catalytic activity at 120° C. under the above described disproportionation reaction conditions. The results are shown in Table 2.

EXAMPLE 6

(1) Reaction of the chloromethylated PSt-DVB and tri-n-octylphosphine 1.1 ml of tri-n-octylphosphine, 2.04 g of the chloromethylated PSt-DVB and 10 ml of DMF were charged in a flask of 50 ml equipped with a condenser, purged adequately with nitrogen, and heated at 155° C. in nitrogen for 12 hours. After cooling, the product was washed and dried in an analogous manner to Example 5 to obtain 2.19 g of a phosphonium chloride-modified resin (Sample No. 6).

(2) Disproportionation reaction of trichlorosilane

Using the phosphonium chloride-modified resin prepared by the above described procedure (1) as a catalyst, disproportionation reaction of trichlorosilane was carried out in an analogous manner to Example 5—(3). The results are shown in Table 2.

EXAMPLE 7

(1) Reaction of the chloromethylated PSt-DVB and triethylphosphine 0.5 ml of triethylphosphine, 2.0 g of the chloromethylated PSt-DVB obtained in Example 5, (1) and 5 ml of DMF were charged in a flask of 50 ml equipped with a condenser, rinsed adequately with nitrogen, and heated at 120° C. in a nitrogen atmosphere for 6 hours. After cooling, the product was washed and dried in an analogous manner to Example 5 to obtain 2.10 g of a phosphonium chloride-modified resin (Sample No. 7).

(2) Disproportionation reaction of trichlorosilane

Using the phosphonium chloride-modified resin (Sample No. 7) prepared by the above described procedure (1) as a catalyst, disproportionation reaction of trichlorosilane was carried out in an analogous manner to Example 5—(3). The results are shown in Table 2.

COMPARATIVE EXAMPLES 1 TO 4

(1) Reaction of the chloromethylated PSt-DVB with triphenylphosphine, tribenzylphosphine, tricyclohexylphosphine or diphenylmethylphosphine Reactions of the chloromethylated PSt-DVB with the above described 4 kinds of the tertiary phosphines were carried out in the same manner as Example 5, (2) to obtain phosphonium chloride-anchored styrene-divinylbenzene copolymer beads corresponding to the respective phosphines. That is, there were formed

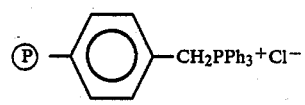

(Comparative Sample No. 1) by the reaction with triphenylphosphine,

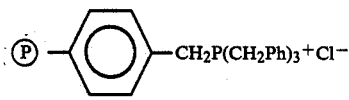

(Comparative Sample 2) by the reaction with tribenzylphosphine,

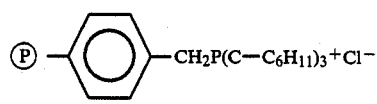

(Comparative Sample No. 3) by the reaction with tricyclohexylphosphine and

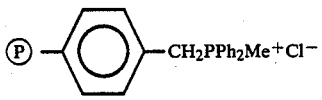

(Comparative Sample No. 4) by the reaction with diphenylphosphine. In these formulas, ⓟ represents a polymer and

represents an aromatic nucleus of the polymer.

(2) Disproportionation reaction of trichlorosilane

Using the phosphonium chloride-bonded beads prepared in Comparative Examples 1 to 4, (1) as a catalyst, disproportionation reaction of trichlorosilane was carried out in an analogous manner to Example 5—(3) to measure a deterioration time of the catalytic activity. The results are shown in Table 2.

COMPARATIVE EXAMPLE 5

(1) Reaction of a styrene-divinylbenzene in which the aromatic nucleus is brominated with triphenylphospine A styrene-divinylbenzene copolymer in which the aromatic nucleus is brominated (hereinafter referred to as Br—Pst—DVB) was prepared in known manner, for example, as disclosed in Japanese Patent Application OPI (Kokai) No. 80307/1983. 8.2 g of the Br—P-St—DVB, 4.0 g of triphenylphosphine and 0.4 g of anhydrous nickel bromide were charged in a flask of 100 ml purged adequately with nitrogen and 30 ml of DMF as a solvent was added thereto, followed by heating and refluxing for 4 hours. The resin beads were then filtered, washed with 100 ml of hot water two times and with 100 ml of ethanol three times, subjected to reduced pressure to remove the ethanol and dried at 100° C. in the air for 12 hours, thus obtaining triphenylphosphonium bromide group-bonded polymer beads,

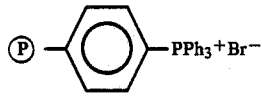

(Comparative Sample No. 5).

(2) Disproportionation reaction of trichlorosilane

Using the catalytic beads (Comparative Sample No. 5) prepared in Comparative Example 5, (1), disproportionation reaction of chlorosilane was carried out in an analogous manner to Example 5, (3). The results are shown in Table 2.

COMPARATIVE EXAMPLE 6

(1) Reaction of the Br—PSt—DVB with tri-n-butylphosphine 4.2 g of the porous styrene-divinylbenzene copolymer beads having bromine atom on the aromatic nucleus (Cf. Comparative Example 5) was charged in a flask of 100 ml equipped with a condenser, rinsed adequately with nitrogen, and heated and refluxed with 0.8 g of tri-n-butylphosphine, 0.15 g of anhydrous nickel bromide and 15 ml of DMF under normal pressure for 6 hours. Then, the resin beads were filtered, washed with, in order, hot water and ethanol, air-dried and dried at 100° C. in the air for 12 hour, thus obtaining polymer beads in which tri-n-butylphosphonium bromide group is bonded to the aromatic nucleus,

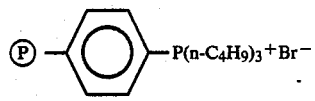

(Comparative Sample No. 6).

(2) Disproportionation reaction of trichlorosilane

Using the catalyst (Comparative Sample No. 6) prepared in Comparative Example 6—(1), disproportionation reaction of trichlorosilane was carried out in an analogous manner to Example 5—(3). The results are shown in Table 2.

Synthesis of a phosphonium salt bonded to a polymer through polymethylene chain

EXAMPLE 8

Synthesis of a $C_4H_8$-bridged phosphonium catalyst 2.3 ml of tri-n-butylphosphine and 4.4 g of 1,4-dibromobutane were charged in a flask of 50 ml equipped with a condenser and heated at 130° C. for 12 hours. The reaction mixture was then subjected to vacuum distillation (130° C., 1 mmHg) to remove volatile components and $P(n-C_4H_9)_3(C_4H_8Br)^+Br^-$ was obtained as a colorless viscous liquid. 1 ml of this viscous liquid and 1.0 g of aluminum chloride were dissolved in 6 ml of nitrobenzene, with which 2.0 g of styrene-divinylbenzene copolymer beads were impregnated. The mixture was heated at 85° C. for 2 hours in nitrogen, to which methanol was added to quench the reaction. The resulting beads were taken by filtration, washed with methanol (4 times), dioxane (2 times) and chloroform (2 times) and then subjected to Soxhlet extraction with tetrahydrofuran for 4 hours. After air-drying, the beads were dried at 100° C. in the air to obtain beads having tri-n-butylphosphonium group chemically bonded to polystyrene through $C_4H_8$ bridging group (Sample No. 8). Using the beads as a catalyst, disproportionation reaction of trichlorosilane was carried out in an analogous manner to Example 5, (3). The results are shown in Table 2.

EXAMPLE 9

Synthesis of a $C_6H_{12}$-bridged phosphonium catalyst $P(n-C_4H_9)_3(C_6H_{12}Br)^+Br^-$ was prepared from 2.3 ml of tri-n-butylphosphine and 4.9 g of 1,6-dibromohexane in an analogous manner to the synthesis method of Example 8 and used for obtaining beads having tri-n-butylphosphonium group chemically bonded to polystyrene through $C_6H_{12}$ group (Sample No. 9). Using the thus resulting beads as a catalyst, disproportionation reaction of trichlorosilane was carried out in an analogous manner to Example 5—(3). The results are shown in Table 2.

EXAMPLE 10

Preparation of a $C_8H_{16}$-bridged phosphonium catalyst $P(n-C_4H_9)_3(C_8H_{16}Br)^+Br^-$ was prepared from 2.3 ml of tri-n-butylphosphine and 5.4 g of 1,8-dibromooctane in an analogous manner to Example 8. 0.48 g of the said phosphonium salt and 1.6 g of aluminum chloride were dissolved in 2.5 ml of nitrobenzene, to which 0.93 g of styrene-divinylbenzene copolymer beads were added, and the mixture was heated at 100° C. for 18 hours and then washed with methanol and chloroform. After air-drying, the thus treated beads were dried at 100° C. in the air to obtain beads having tri-n-butylphosphonium group chemically bonded to polystyrene through $C_8H_{16}$ bridging group (Sample No. 10).

Using the thus resulting beads as a catalyst, disproportionation reaction of trichlorosilane was carried out in an analogous manner to Example 5—(3). The results are shown in Table 2.

EXAMPLE 11

Synthesis of a $C_{10}H_{20}$-bridged phosphonium catalyst

In an analogous manner to Example 8, a solution of 3.77 g of tri-n-octylphosphine and 6.22 g of 1,10-dibromodecane in 10 ml of DMF was charged in a flask of 25 ml equipped with a condenser, heated with agitation at 130° C. in nitrogen for 14.5 hours and then subjected to vacuum distillation to obtain $P(n-C_8H_{17})_3(C_{10}H_{20}Br)^+Br^-$. 0.72 g of the said phosphonium salt and 1.0 g of aluminum chloride were dissolved in 1.5 ml of nitrobenzene, to which 0.93 g of styrene-divinylbenzene copolymer beads were added, and the mixture was heated at 100° C. for 12 hours, then washed with methanol and chloroform, air-dried and dried at 100° C. in the air, thus obtaining beads having tri-n-octylphosphonium group chemically bonded to polystyrene through $C_{10}H_{20}$ bridging group (Sample No. 11).

Using the thus resulting modified beads as a catalyst, disproportionation of trichlorosilane was carried out in an analogous manner to Example 5—(3). The results are shown in Table 2.

Preparation of a catalyst by reaction of a haloalkylated polystyrene and trialkylphosphine

COMPARATIVE EXAMPLE 7

Preparation of a $C_2H_4$-bridged phosphonium catalyst 2.0 ml of 1,2-dibromoethane and 4.5 ml of nitrobenzene were charged in a flask of 50 ml rinsed with nitrogen, to which 2.0 g of styrene-divinylbenzene copolymer beads were then added for impregnation therewith. 0.35 g of aluminum chloride dissolved in 2 ml of nitrobenzene was added thereto and the mixture was heated at 70° C. for 1.5 hours, then washed with methanol 4 times, air-dried and then dried at 100° C. in the air for 10 hours to obtain haloethylated styrene-divinylbenzene copolymer beads. 0.5 g of the said beads and 0.5 ml of tri-n-butylphosphine were added to 2 ml of DMF, heated at 160° C. in nitrogen for 12 hours, separated by filtration, washed with methanol 4 times and with chloroform 2 times, air-dried and then dried in the air at 100° C. for 6 hours, thus obtaining beads having tri-n-butylphosphonium group, represented by

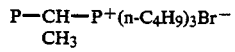

(Comparative Sample No. 7).

Using the thus resulting beads as a catalyst, disproportionation reaction of trichlorosilane was carried out in an analogous manner to Example 5—(3). The results are shown in Table 2, from which it is apparent that deterioration of the activity of the catalyst is remarkable due to the fact that the polymer is bonded to the phosphorus atom through a secondary carbon.

COMPARATIVE EXAMPLE 8

Synthesis of a $C_4H_8$-bridged phosphonium catalyst

The procedure of Comparative Example 7 was repeated except using 1,4-dibromobutane in place of the 1,2-dibromoethane and tri-n-octylphosphine in place of the tri-n-butylphosphine, thus obtaining beads having tri-n-octylphosphonium group chemically bonded to polystyrene (Comparative Sample No. 8).

Using the thus resulting beads as a catalyst, disproportionation reaction of trichlorosilane was carried out in an analogous manner to Example 5—(3). The results are shown in Table 2, from which it is apparent that deterioration of the activity of this catalyst is rapid since most of the phosphorus atoms of the phosphonium groups are bonded to the carbon atoms at the $\alpha$, $\beta$ and $\gamma$ positions in

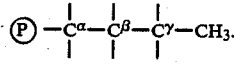

COMPARATIVE EXAMPLE 9

Synthesis of a $C_6H_{12}$-bridged phosphonium catalyst

The procedure of Comparative Example 7 was repeated except using 1,6-dibromohexane in place of the 1,2-dibromoethane and tri-n-octylphosphine in place of the tri-n-butylphosphine, thus obtaining beads having tri-n-octylphosphonium group chemically bonded to polystyrene (Comparative Sample No. 9).

Using the thus resulting beads as a catalyst, disproportionation reaction of trichlorosilane was carried out in an analogous manner to Example 5—(3). The results are shown in Table 2, from which it is apparent that deterioration of the catalytic activity is rapid since most of the phosphorus atoms of the phosphonium group are bonded to the inner carbon atoms of the $C_6H_{12}$-bridging group similarly to Comparative Example 8.

EXAMPLE 12

Preparation of $-(CH_2)_8$-bridged phosphonium catalyst (1) Lithiation of styrene-divinylbenzene copolymer 3.0 g of styrene-divinylbenzene copolymer beads, 3.35 g of tetramethylethylenediamine (hereinafter referred to as TMEDA), 30 ml of cyclohexane and 80 ml of a solution of n-hexyllithium (0.42 mol) in hexane were added to a 4-necked flask of 200 ml equipped with a stirrer and heated with stirring at 65° C. in a nitrogen atmosphere for 14 hours. After the reaction, the reaction mixture was subjected to decantation to remove a solution portion and washed with cyclohexane to obtain a styrene-divinylbenzene copolymer in which the phenyl ring is lithiated.

(2) A solution of 1,8-dibromooctane in 80 ml of benzene was added to the lithiated styrene-divinylbenzene copolymer beads, and stirred at room temperature for 6.5 hours and thereafter at 50° C. for 1 hour. The copolymer beads were taken by filtration, washed with, in order, tetrahydrofuran, ether, tetrahydrofuran-water (2/1), water, tetrahydrofuran, benzene and methanol, air-dried and then dried in the air at 100° C. to obtain beads of a 8-bromooctylated styrene-divinylbenzene copolymer.

(3) Reaction of the 8-bromooctylated styrene-divinylbenzene copolymer beads with tri-n-butylphosphine 2.0 g of the 8-bromooctylated styrene-divinylbenzene copolymer beads, 0.9 ml of tri-n-butylphosphine and 10 ml of N,N-dimethylformamide were charged in a flask of 50 ml equipped with a condenser, heated at 100° C. in a nitrogen atmosphere for 3.5 hours, cooled and subjected to filtration to obtain the copolymer beads which were then washed with methanol and chloroform, air-dried and then dried in the air at 100° C., thus obtaining beads having tri-n-butylphosphonium group chemically bonded to polystyrene through $C_8H_{16}$-bridging group (Sample No. 12).

Using the thus resulting beads as a catalyst, disproportionation reaction of trichlorosilane was carried out in an analogous manner to Example 5—(3). The results are shown in Table 2.

EXAMPLE 13

Preparation of a —$(CH_2)_6$-bridged phosphonium catalyst

Styrene-divinylbenzene copolymer beads in which 6-bromohexyl group is bonded to the phenyl group were obtained from lithiated styrene-divinylbenzene copolymer beads prepared using n-butyllithium as a metallating agent in an analogous manner to Example 12 and 1,6-dibromohexane. 1.0 g of the thus resulting beads and 0.4 ml of tri-n-butylphosphine were reacted at 140° C. in 5 ml of DMF for 14.5 hours to obtain beads having tri-n-butylphosphonium group chemically bonded to polystyrene through $C_6H_{12}$-bridging group (Sample No. 13).

Using the thus resulting beads as a catalyst, disproportionation reaction of trichlorosilane was carried out in an analogous manner to Example 5—(3). The results are shown in Table 2.

EXAMPLE 14

Preparation of a —$(CH_2)_2$-bridged phosphonium catalyst 2-bromoethylated styrene-divinylbenzene copolymer beads prepared in an analogous manner to Example 13 except using 1,2-dibromoethane instead of the 1,6-dibromohexane and tri-n-butylphosphine were reacted to obtain beads having tri-n-butylphosphonium group chemically bonded to polystyrene through $C_2H_4$-bridging group (Sample No. 14).

Using the thus resulting beads as a catalyst, disproportionation reaction of trichlorosilane was carried out in an analogous manner to Example 5—(3). The results are shown in Table 2.

EXAMPLE 15

Synthesis of a tetramethylene-bridged phosphonium catalyst and disproportionation reaction of trichlorosilane 3.0 g of a styrene-divinylbenzene copolymer whose aromatic nucleus was brominated (Cf. Comparative Example 5) was charge in a flask of 50 ml equipped with a condenser and swelled with 10 ml of absolute tetrahydrofuran. Then, 10 ml of n-propyllithium/petroleum ether (1 mol/l) was dropwise added thereto at room temperature and thereafter, reacted at room temperature for 1 hour. Withdrawing the liquid phase by a syringe, 5 ml of absolute benzene and 5 ml of 1,4-dibromobutane were in order added to the flask and heated at 80° C. for 2 hours. 5 ml of methanol was then added to the flask to quench the reaction and the resulting styrene-divinylbenzene beads were washed with 50 ml of methanol 3 times, with water 2 times and with methanol 3 times and air-dried. 1.5 g of the thus resulting 4-bromobutyl group-modified beads were heated at 120° C. in a nitrogen atmosphere for 60 hours with 2.5 ml of N,N-dimethylformamide and 1.0 ml of tri-n-butylphosphine and then washed with methanol 3 times and with chloroform once, thus obtaining beads having tri-n-butylphosphonium group chemically bonded to the styrene-divinylbenzene copolymer through tetramethylene group (Sample No. 15).

Using the resulting beads as a catalyst, disproportionation reaction of trichlorosilane was carried out in an analogous manner to Example 5—(3). The results are shown in Table 2.

EXAMPLE 16

Synthesis of a decamethylene-bridged phosphonium catalyst and disproportionation reaction of trichlorosilane The procedure of Example 15 was repeated except that the lithiated resin was heated with 5 ml of benzene and 4 ml of 1,10-dibromodecane.

Using the thus resulting beads having tri-n-butylphosphonium group chemically bonded to the styrene-divinylbenzene copolymer through decamethylene group (Sample No. 16) as a catalyst, disproportionation reaction of trichlorosilane was carried out in an analogous manner to Example 5—(3). The results are shown in Table 2.

TABLE 2

| Catalyst Sample No. | Reaction Temperature (°C.) | SV (min$^{-1}$) | Reaction Products (mol %) | | | | Half-life of Disproportionation Activity (hr) |
|---|---|---|---|---|---|---|---|
| | | | $SiH_3Cl$ | $SiH_2Cl_2$ | $SiHCl_3$ | $SiCl_4$ | |
| Examples 5-16 | | | | | | | |
| 5 | 121 | 400 | 0.5 | 10.2 | 79.3 | 10.0 | 57 |
| 6 | 120 | 275 | 0.4 | 7.7 | 84.2 | 7.7 | 260 |
| 7 | 120 | 360 | 0.4 | 8.4 | 82.3 | 8.9 | 85 |
| 8 | 121 | 50 | 0.2 | 7.2 | 85.7 | 6.9 | 62 |
| 9 | 121 | 400 | 0.6 | 10.0 | 78.7 | 10.7 | 119 |

TABLE 2-continued

| Catalyst Sample No. | Reaction Temperature (°C.) | SV (min$^{-1}$) | Reaction Products (mol %) | | | | Half-life of Disproportionation Activity (hr) |
|---|---|---|---|---|---|---|---|
| | | | SiH$_3$Cl | SiH$_2$Cl$_2$ | SiHCl$_3$ | SiCl$_4$ | |
| 10 | 121 | 105 | 0.2 | 4.9 | 90.2 | 4.7 | 60 |
| 11 | 120 | 80 | 0.5 | 9.5 | 80.5 | 9.5 | 70 |
| 12 | 120 | 150 | 0.2 | 7.2 | 82.9 | 9.7 | 500 |
| 13 | 120 | 200 | 0.2 | 6.8 | 83.7 | 9.3 | 360 |
| 14 | 120 | 200 | 0.2 | 7.4 | 85.6 | 6.8 | 60 |
| 15 | 120 | 250 | 0.6 | 10.9 | 77.4 | 11.1 | 80 |
| 16 | 120 | 200 | 0.6 | 11.0 | 77.5 | 10.9 | 96 |
| Comparative Examples 1-9 | | | | | | | |
| 1 | 119 | 438 | 0.5 | 9.3 | 80.5 | 9.7 | 8 |
| 2 | 120 | 23 | 0.1 | 5.6 | 89.6 | 4.7 | 2 |
| 3 | 120 | 700 | 0.4 | 10.0 | 80.3 | 9.3 | 8 |
| 4 | 121 | 432 | 0.2 | 6.9 | 86.3 | 6.6 | 16 |
| 5 | 120 | 144 | 0.6 | 9.7 | 79.4 | 10.3 | 4 |
| 6 | 120 | 137 | 0.2 | 5.9 | 88.1 | 5.8 | 11 |
| 7 | 119 | 268 | 0 | 0.5 | 99.0 | 0.5 | 8 |
| 8 | 120 | 101 | 0.2 | 6.7 | 86.2 | 6.9 | 9 |
| 9 | 122 | 400 | 0.2 | 5.6 | 88.7 | 5.5 | 18 |

Note:
The reaction products (mol %) are according to the analytical values after 1 to 2 hours from the start of the reactions.

As is evident from the results of Table 2, the catalyst of the present invention is more suitable for commercial use than that of the prior art, since the former has a much longer half-life of catalytic activity than the latter.

Comparison of the activities of the catalysts, based on the content of phosphorus atoms, is as follows: The activity A based on the content of phosphorus atoms is obtained by the following formula and the activity Ao at the start of reaction (t=0) is determined by extrapolation.

$$A = \ln \frac{Ceq}{Ceq - C} \cdot \frac{SV}{N}$$

ln: natural logarithm
Ceq: equilibrium conversion of trichlorosilane at reaction temperature
C: found conversion of trichlorosilane at reaction temperature
SV: space velocity (min$^{-1}$)
N: phosphorus concentration in 1 ml of catalyst (meq/ml)

The comparison of some catalysts in Examples and Comparative Examples is carried out to give results as shown in Table 3. Consequently, it is found that the catalysts in which tricyclohexylphosphine or triphenylphosphine is bonded as in Comparative Sample Nos. 3 and 5 show larger initial activities. Thus, it can be assumed that the initial activity per phosphorus atom is related with the steric size of a phosphonium group. However, the catalysts of Comparative Sample Nos. 3 and 5 show much shorter half-lives of the activity, i.e. 8 hours and 4 hours. Collectively, the catalysts of Examples according to the present invention, having a much longer half-life, are suitable for continuous operations.

TABLE 3

| Catalyst | Reaction Temperature (°C.) | Phosphorus Content (meq/ml) | Ao |
|---|---|---|---|
| Sample No. 5 | 121 | 0.17 | 3770 |
| Sample No. 16 | 120 | 0.11 | 3860 |
| Comparative Sample No. 3 | 120 | 0.17 | 6920 |
| Comparative Sample No. 5 | 120 | 0.055 | 4270 |

What is claimed is:

1. A process for the production of a catalyst for disproportionation reaction of chlorosilanes, which comprises (a) a step of contacting an organic high molecular weight compound in which a halogen atom is directly bonded to an aromatic nucleus with metallic lithium and an α,ω-dihaloalkane represented by the general formula X—(CH$_2$)$_n$—X' wherein X and X' are same or different halogen atoms and n is an integer of from 2 to 10 in a solvent and thereby obtaining an organic high molecular weight compound whose aromatic nucleus is ω-haloalkylated, (b) a step of reacting the thus ω-haloalkylated organic high molecular weight compound with a trialkylphosphine, and thereby forming a catalyst in which the tetraalkylphosphonium salt is bonded to the organic high molecular weight compound through the alkylene group as a bridging group.

2. The process of claim 1, wherein the organic high molecular weight compound is one member selected from the group consisting of polystyrenes and styrene-divinylbenzene copolymers.

3. The process of claim 1, wherein the α,ω-dihaloalkane is one member selected from the group consisting of 1,2-dibromoethane, 1,3-dibromopropane, 1,4-dibromobutane, 1,5-dibromopentane, 1,6-dibromohexane, 1,7-dibromoheptane, 1,8-dibromooctane, 1,10-dibromodecane, 1,3-bromochloropropane, 1,4-dichlorobutane and 1,6-dichlorohexane.

4. The process of claim 1, wherein the solvent used in the step (a) is an ether type solvent.

5. The process of claim 1, wherein the metallic lithium and α,ω-dihaloalkane are used respectively in a proportion of 0.1 to 2 gram atoms and 0.1 to 1 mol to 1 mol of the halogenated organic high molecular weight compound.

6. The process of claim 1, wherein the trialkylphosphine is one member selected from the group consisting of trimethylphosphine, triethylphosphine, tri-n-propylphosphine, tri-n-butylphosphine, tri-n-hexylphosphine, tri-n-octylphosphine, dipropylbutylphosphine, triisobutylphosphine, triisopentylphosphine, triisohexylphosphine, triisooctylphosphine and trineopentylphosphine.

7. The process of claim 1, wherein the reacting in the step (b) is carried out at a temperature of 50° to 180° C. in the presence of a solvent.

8. The process of claim 7, wherein the solvent is at least one member selected from the group consisting of N,N-dimethylformamide, N-methylpyrrolidone, chlorobenzene, toluene and benzene.

9. The process of claim 7, wherein the solvent is a phosphine itself in the case where the phosphine has a sufficiently high boiling point.

* * * * *